Oct. 10, 1933.  H. L. BLUM  1,929,407
MULTIPLE QUANTITY REPEATING AUTOMATIC METER
Filed Aug. 19, 1929  7 Sheets-Sheet 1

Inventor:
Hosmer L. Blum,
By Chas. M. Nissen,
Attorney.

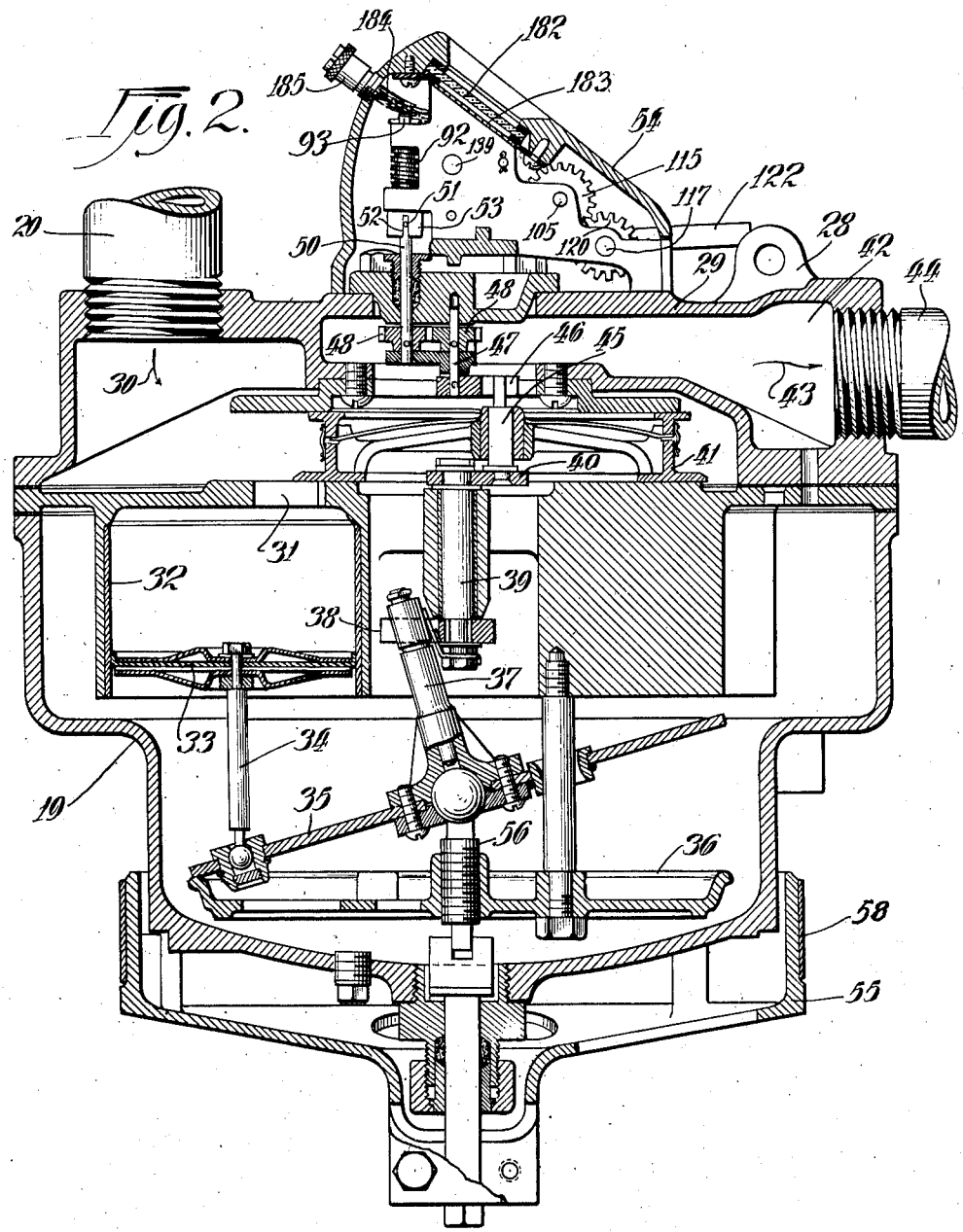

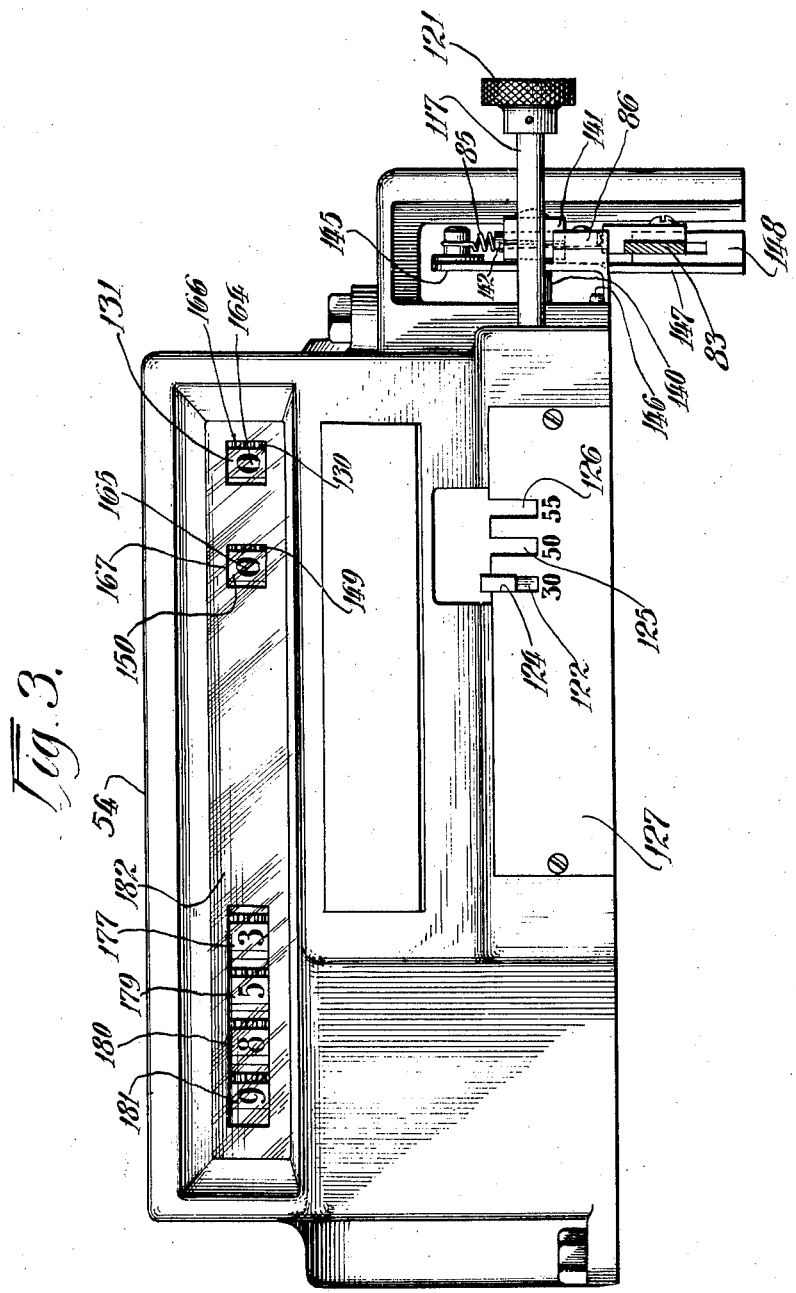

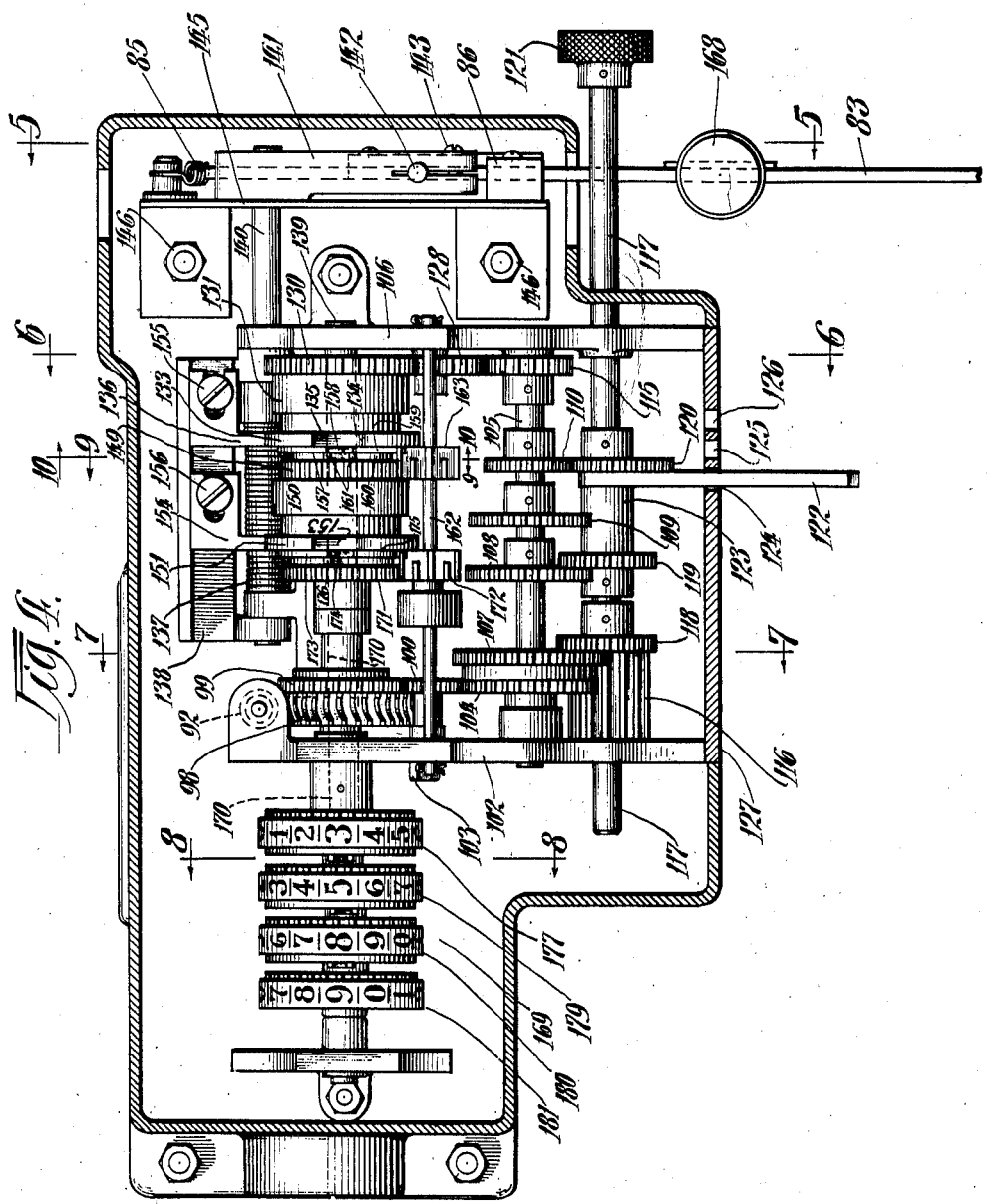

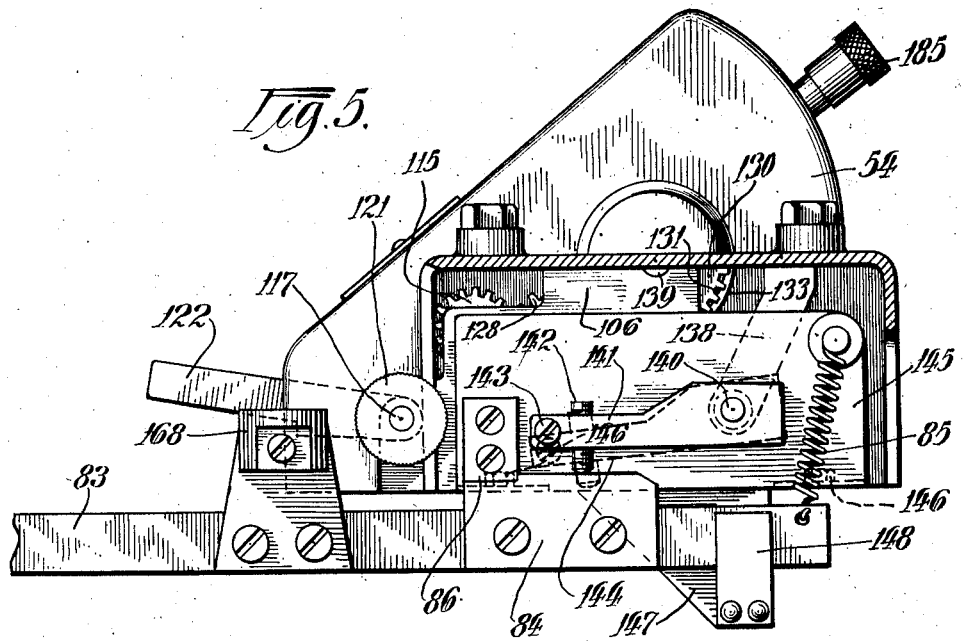
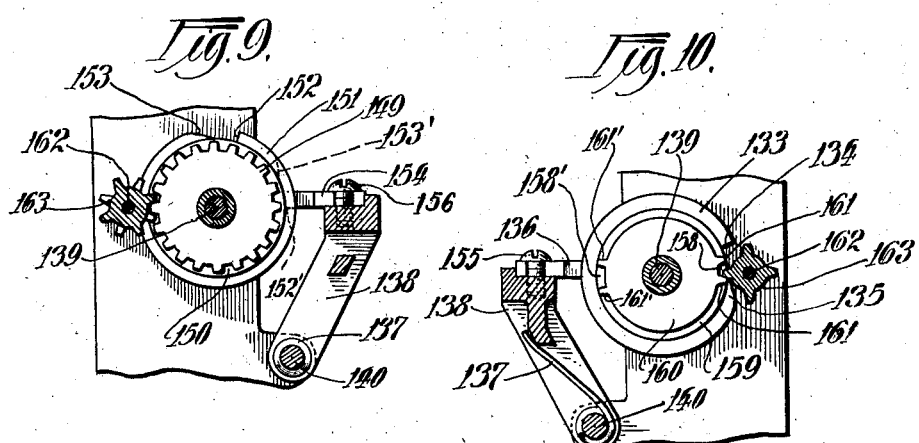
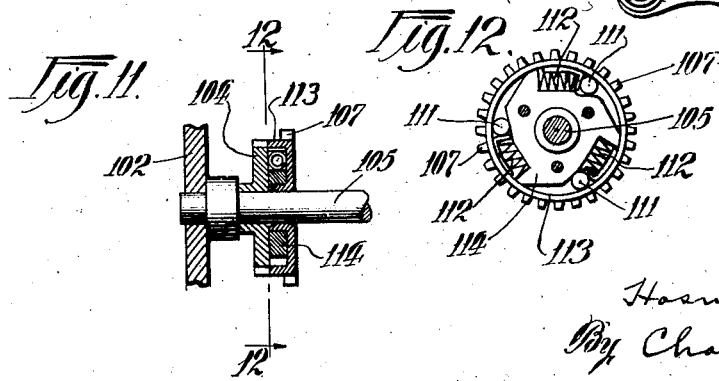

Oct. 10, 1933.                H. L. BLUM                1,929,407
              MULTIPLE QUANTITY REPEATING AUTOMATIC METER
                  Filed Aug. 19, 1929         7 Sheets-Sheet 6
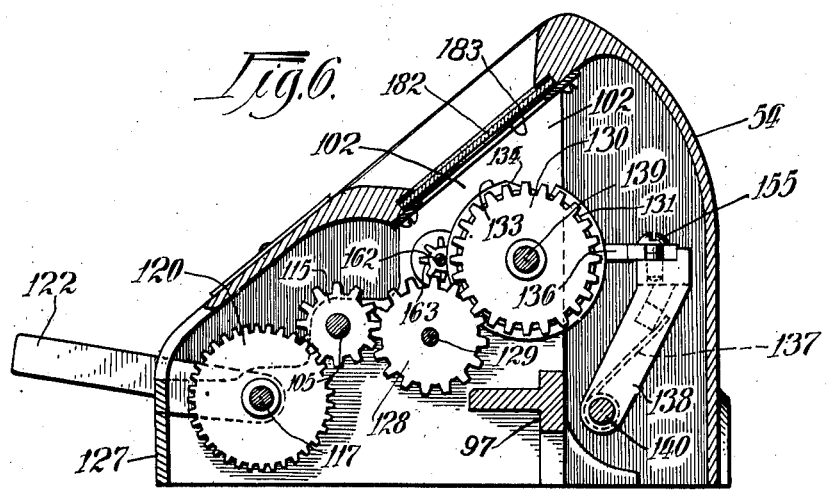
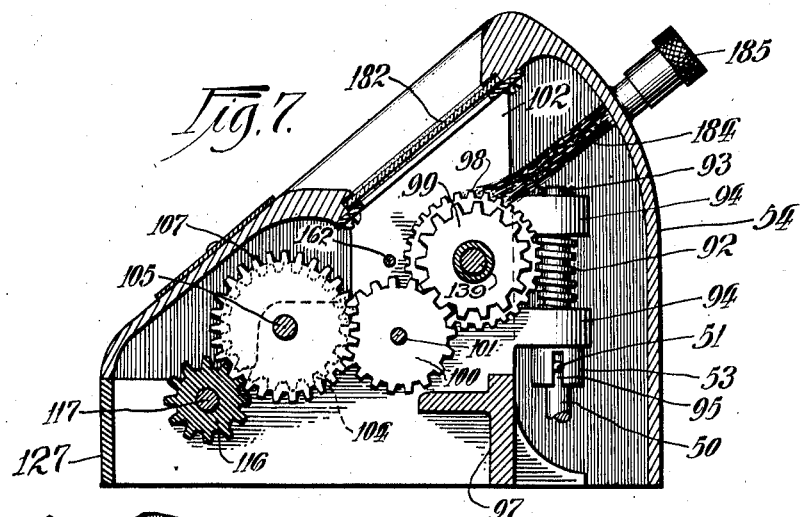
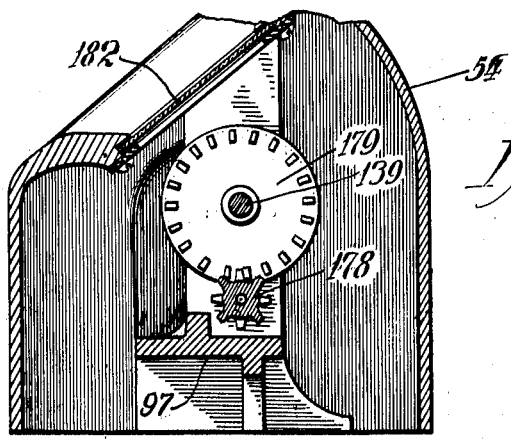
Inventor:
Hosmer L. Blum,
By Chas. M. Nissen,
Attorney

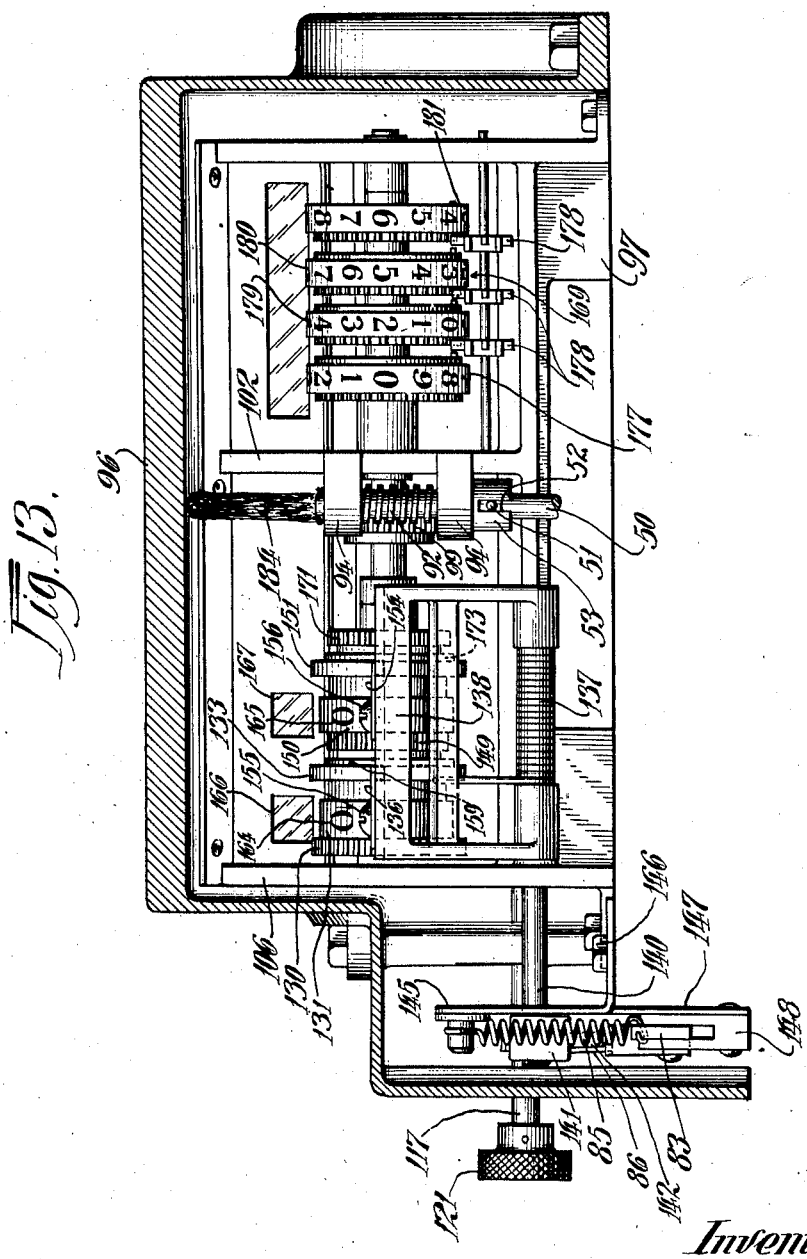

Patented Oct. 10, 1933

1,929,407

UNITED STATES PATENT OFFICE 1,929,407

MULTIPLE QUANTITY REPEATING AUTOMATIC METER

Hosmer L. Blum, Fort Wayne, Ind., assignor to S. F. Bowser & Company, Inc., Fort Wayne, Ind., a corporation of Indiana Application August 19, 1929. Serial No. 387,012

28 Claims. (Cl. 221—101)

My invention relates to meters for measuring the quantity of flow of liquids and one of its objects is the provision of improved and efficient mechanism for predetermining the quantity of liquid that shall flow and automatically stop such flow upon delivery of such predetermined quantity.

A further object of the invention is the provision of apparatus for predetermining the quantity of liquid that shall flow through a meter and automatically stopping such flow by means of the meter when such predetermined quantity has been reached.

Another object of the invention is the provision of multiple quantity predetermining mechanism which may be set to effect the delivery of any one of a plurality of predetermined quantities and automatically stopping the flow upon the delivery of the selected predetermined quantity.

Another object of the invention is the provision of multiple quantity predetermining mechanism connected to a meter for operation thereby to enable any one of a plurality of quantities to be predetermined and causing the flow to be discontinued upon the delivery of the selected predetermined quantity.

A further object of the invention is the provision of multiple quantity predetermining mechanism combined with a meter and a totalizer for indicating the number of the predetermined selected quantities delivered.

More particularly it is the object of the present invention to provide improved and efficient mechanism between a meter, and a totalizer for enabling the selection of any one of a plurality of predetermined quantities of liquid and the automatic stopping of the flow of liquid upon the delivery of the selected predetermined quantity while the totalizer records the delivered quantity as a unit.

Other objects of the invention will appear hereinafter, the novel features and combinations being set forth in the appended claims.

In the accompanying drawings—

Fig. 2 is a sectional elevational view of the meter showing the connection to the selecting, stopping and recording mechanism;

Fig. 3 is an enlarged elevational view of the mechanism mounted on top of the meter as shown in Fig. 2;

Fig. 4 is a sectional plan view of the cover shown in Fig. 3 to show in plan the selecting, stopping and recording mechanism;

Fig. 5 is a sectional elevation taken on the line 5—5 of Fig. 4 looking in the direction of the arrows;

Fig. 6 is a sectional elevation taken on the line 6—6 of Fig. 4 looking in the direction of the arrows;

Fig. 7 is a sectional elevation taken on the line 7—7 of Fig. 4 looking in the direction of the arrows;

Fig. 8 is is a sectional elevation taken on the line 8—8 of Fig. 4 looking in the direction of the arrows;

Fig. 9 is a sectional elevation of a portion of Fig. 4 looking in the direction of the arrows 9, 9;

Fig. 10 is a sectional elevation of the same portion of Fig. 4 looking in the opposite direction as indicated by the arrows 10, 10;

Figs. 11 and 12 are detail views of certain clutch driving mechanism; and

Fig. 13 is a rear elevation of the structure shown in plan in Fig. 4.

Figure 1:
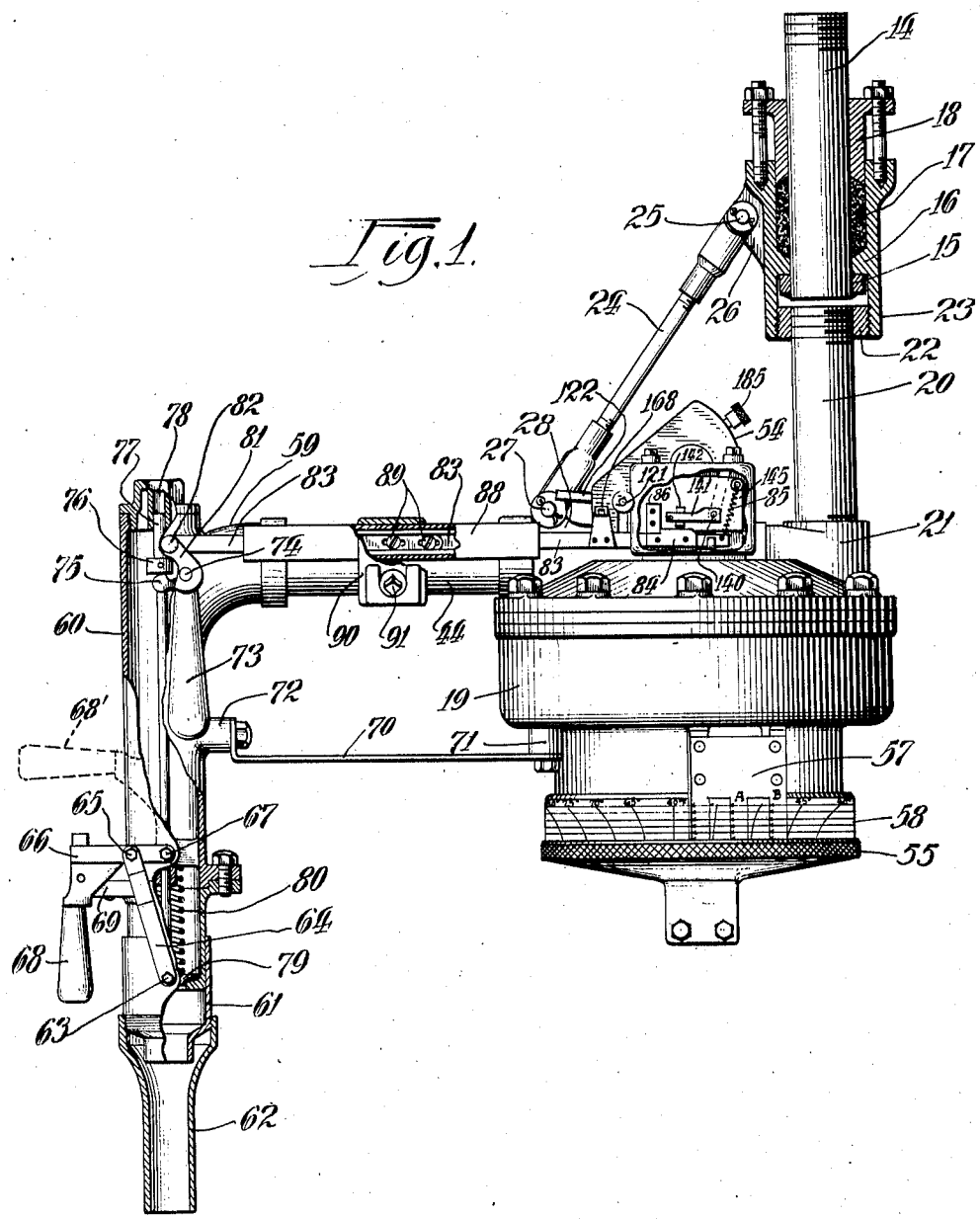
Fig. 1 is an elevational view, partly in section, of a three-quantity meter barreling unit embodying my invention.

Referring more particularly to the accompanying drawings it will be seen that in Fig. 1 I have shown a complete barreling unit which may be suspended from the pipe 14 so as to be rotatable to various angular positions on the upright axis of the pipe 14. For this purpose a collar 15 may be secured to the lower end of the pipe 14 and the packing-box 16 swiveled on the pipe 14 above the fixed collar 15. Packing 17 in the packing-box 16 may be held in place by the packing gland 18, as illustrated.

The meter 19 is suspended from the packing-box 16 by means of the pipe 20 which is secured at its lower end to the inlet port 21 of the meter. The upper end of the pipe 20 is secured by means of the nut 22 to the cylindrical extension 23 from the packing box 16. An adjustable link 24 is pivoted at 25 to a bracket 26 on the packing-box 16. The lower end of the link 24 is pivoted at 27 to a bracket 28 on top of the upper housing 29 of the meter body as shown in Figs. 1 and 2.

The meter 19 is preferably of the piston displacement type and is shown in sectional elevation in Fig. 2 to illustrate the operation by means of the meter of the mechansim for automatically stopping the flow of the liquid when a predetermined selected quantity has been delivered and recording the quantity as a unit delivered. The meter may be of the type shown in my Patent No. 1,423,597, granted July 25, 1922, for an improvement in Meter, and I will therefore only briefly describe the construction and operation of the meter shown in Fig. 2. It should be understood, however, that I do not wish to be limited to the use of this particular type of meter as other forms may be used in connection with my improvements provided accurate measurement is obtained and a rotary driving connection may be extended to the automatic stopping mechanism and the automatic totalizer.

When the liquid enters the meter through the pipe 20 as shown in Fig. 2, it will flow in the direction of the arrow 30 through the port 31 into the cylinder 32, thereby displacing the piston 33 and transmitting downward movement to the piston rod 34 and to the wabble plate 35. There is a plurality of cylinders 32 each with a piston 33 therein and each piston is provided with a piston rod connected to the wabble plate 35. The connections of the piston rods to the wabble plate 35 are distributed around the peripheral portion of the wabble plate 35. During the operation of the meter the wabble plate will travel on the track 36, and move along a conical path the upright drive arm 37 which is connected to the crank arm 38. Therefore when the wabble plate 35 is driven around the circular track 36 the vertical shaft 39 connected to the crank 38 will be rotated. The crank arm 40 at the upper end of the shaft 39 will therefore operate the valve 41 to control the ports 31. When the piston 33 moves upwardly the port 31 will be open through the valve 41 to the outlet chamber 42, the flow being indicated by the arrow 43 to the outlet pipe 44.

The upper end of the vertical drive arm 45 at the center of the valve 41 extends into a bifurcation of the crank arm 46 which operates the vertical shaft 47 and transmits motion to the gears 48, 48 to the vertical shaft 50. The upper end of this vertical shaft 50 is provided with a cross-pin 51 which fits in a slot 52 of the driving connection 53 for the selecting and recording mechanism which is enclosed by the cover 54.

By means of the wheel 55 at the bottom of the meter the screw-threaded support 56 for the center of the wabble plate 35 may be adjusted in elevation and in this manner the meter may be accurately set to insure proper measurement of the quantity of liquid flowing at a given temperature and for the specific gravity of the liquid at the operating temperature. Scales for this purpose are shown at 57 and 58. However, this adjusting mechanism for temperature and specific gravity is no part of the present invention but is referred to for the reason that I have described and claimed adjusting mechanism for this type of meter in my co-pending application, Serial No. 298,751, filed August 10, 1928, for an improvement in Meters. In another co-pending application, Serial No. 220,872, filed September 21, 1927, for an improvement in Meters, I have described and claimed the improvements of the meter construction shown in Fig. 2 of the accompanying drawings.

As shown in Fig. 1, the pipe 44 leading from the outlet port of the meter is connected to an elbow 59 at the upper portion of the vertical pipe 60. The lower end of the pipe 60 is provided with a nozzle 61 slidable vertically over the outlet lower end portion of the pipe 60. An auxiliary or delivery nozzle 62 is connected to the lower end of the nozzle 61. At the sides of the nozzle 61 are pivoted at 63 a pair of links 64, the upper ends of which are pivoted at 65 to the levers 66. The inner ends of these levers 66 are pivoted at 67 to the sides of the pipe 60 and a handle 68 is provided for actuating the links 64. When the handle 68 is moved to its dotted line position 68' the nozzles 61 and 62 will be lifted to their uppermost positions so that a barrel or other container may be adjusted with its bung hole directly under the nozzle 62 and upon moving the handle 68 back to its vertical position against the stop bracket 69 the nozzle 62 may be thrust into the bung hole of a barrel or other container. In order to brace the pipe 60, a plate 70 may be secured at 71 to the meter 19 and at 72 to the rear side of the pipe 60 as shown in Fig. 1.

After the nozzle 62 has been inserted into the filling opening in the container which is to be filled the handle 73 may be operated in a clockwise direction to rotate the shaft 74 which extends through the body of the pipe 60 and carries at its inner end a cam 75. This cam is located under a collar 76 secured to the vertical valve stem 77. The upper end of the valve stem is guided in the recess 78 and its lower end is connected to the valve 79. By referring to Fig. 1 it will be seen that when the handle 73 is moved in a clockwise direction the cam 75 will be lifted to act on the collar 76, which in turn lifts the valve stem 77 and opens the valve 79 against the action of the spring 80. When the handle 73 is released the tendency is for the spring 80 to close the valve 79.

Mechanism is, however, provided for holding the valve 79 open after the handle 73 is released. Extending from the upper end of the lever or handle 73 is an auxiliary arm 81 which is pivoted at 82 to the left-hand end of the link 83. The right-hand end of the link 83 is provided with a latch 84. A spring 85 is connected to the extreme right-hand end of the link 83 to hold the latter in its upper position. When the link 83 is moved to the right the latch 84 is moved past the pawl 86. When the handle 73 is released the latch 84 engages the pawl 86 and holds the link 83 in its right-hand position and consequently the valve 79 will be held open. When desired, the push-button 168 may be depressed against the action of the spring 85, whereupon the spring 80 will close the valve 79 and operate through the collar 76, the cam 75, the shaft 74 and the arm 81 to move the link 83 back to its initial position where the latch 84 will be released from the fixed pawl 86. The link 83 may be adjusted in length by means of the pin and slot connections shown at 89, Fig. 1, which pin and slot connections are between two sections of the link 83. The adjustment should be such that when the valve 79 is opened the latch 84 will engage and be held by the pawl 86 and when the latch is tripped by the push-button 87 the valve 79 will be fully closed.

The extensible bar or link 83 is guided through a tube 88 of sufficient diameter to permit up and down movement of the link 83 so that the latch 84 may be released from the pawl 86. The guide tube 88 may be mounted on the bracket 90 secured at 91 to the pipe 44.

As shown in Figs. 2 and 7, the vertical shaft 50 of the meter is coupled at 51, 53 to the worm 92 on a shaft 93 which rotates in the bearings 94, 94. It should be understood that the pin 51 is on the upper end of the shaft 50 and that the coupling 53 may be made by means of its diametrical slots 52 being placed over the pin 51. The enclosing cover 54 together with the frame 97 are removably attached to the top of the meter housing. When the cover 54 and the frame 97 are assembled on top of the meter housing, the coupling 53 is simply slipped over the top of the cross-pin 51.

The worm 92 meshes with a worm gear 98 as shown in Figs. 4 and 7. Secured to the worm gear 98 at one side thereof is a spur gear 99. The spur gear 99 meshes with the pinion 100 and is mounted on a short shaft 101 fixed to the vertical wall 102 as shown at 103 in Fig. 4.

The pinion 100 meshes with a gear 104 which is mounted loosely on the shaft 105 as shown in detail in Fig. 11. The shaft 105 has its ends mounted in bearings in the vertical plates 102 and 106. Secured to the shaft 105 to rotate therewith are the gears 108, 109, 110 and 115. The gear 107 is loose on the shaft 105.

Between the gears 104 and 107 is the ball clutch mechanism comprising the balls 111 and the springs 112 mounted in the cup 113 at the left-hand side of the gear 107.

When the meter shown in Fig. 2 operates, it rotates the worm 92 in a clockwise direction as viewed in plan, and this effects a clockwise rotation of the worm gear 98 as viewed in Fig. 7. The gear 99 will likewise be rotated in a clockwise direction, the gear 100 will be rotated anti-clockwise, and the gear 104 will be rotated in a clockwise direction. The clutch element 114 shown in Figs. 11 and 12 is secured to the right-hand face of the gear 104. Therefore when the gear 104 is rotated clockwise as viewed in Fig. 7, the clutch element 114 as viewed in Fig. 12 will be rotated anti-clockwise; consequently the balls 111 will clutch the interior annular surface of the drum or ring 113 and transmit motion to the gear 107. It therefore follows that when clockwise rotation is imparted to the worm gear 98 by operation of the meter, clockwise operation will also be imparted through the clutch shown in Fig. 12 to the gear 107. It should be understood, however, that the gear 107 is mounted to rotate loosely on the shaft 105. Therefore rotation of the gear 107 from the meter does not impart rotation to the shaft 105.

The gear 107 meshes with the elongated gear 116 which is secured to the sliding shaft 117 mounted in bearings in the upright plates 102 and 106. Also secured to the shaft 117 to rotate therewith are the pinions 118, 119 and 120 as shown in Fig. 4. At the right-hand end of the shaft 117 is a knob 121 for rotating the shaft 117. A lever 122 has a hub 123 which is mounted loosely on the shaft 117. The lever 122 may rest in the slot 124 representing thirty gallons as a predetermined quantity of liquid to be automatically delivered. The slot 125 may represent fifty gallons as the predetermined quantity to be delivered, and the slot 126 may represent fifty-five gallons as the predetermined quantity to be delivered.

The relative positions of the shafts 105 and 117 when viewed endwise are shown in Fig. 7. When the lever 122 is in the slot 124 of the plate 127 the gears 120 and 110 are in mesh. Therefore when the meter transmits clockwise rotation to the gear 107 as viewed from the right-hand end of Fig. 4, anti-clockwise rotation will be transmitted through the gear 116 to the shaft 117. The gears 120 and 110 being in mesh, clockwise rotation will be imparted to the shaft 105, consequently the gear 115 as viewed in Fig. 6 will be rotated clockwise. The gear 115 meshes with the gear 128 on the bearing 129 secured to the plate 106. The gear 128 meshes with the gear 130 which is connected to the drum or wheel 131 having the designation "Zero" thereon as shown at 164 in Fig. 3 to indicate its initial position. The left-hand face of the drum 131 carries a cam 133. The cam 133 is shown in end elevation in Fig. 10. Almost the entire circumference of the cam 133 is cylindrical but is provided with a radial face at 134 and an inclined face at 135. As viewed from the right-hand end of Fig. 4, the gear 130 is operated by the meter in a clockwise direction. Fig. 10 being a view taken on the line 10—10 of Fig. 4 looking in the direction of the arrows, shows the cam 133 as viewed from the left-hand side; therefore the rotation as viewed in Fig. 10 of the cam 133 will be anti-clockwise and when the straight face 134 reaches its left-hand side position the pawl 136 which wipes against the cylindrical face of the cam 133 will drop in the notch between the faces 134 and 135 of the cam 133. The spring 137 will then move the arm 138 toward the shaft 139. The arm 138 is secured to the rock shaft 140 to the outer end of which is secured the lever 141 as shown in Fig. 5. A set screw 142 extends through a split portion of the arm 141. After the set screw 142 has been adjusted in position relative to the arm 141 it may be locked by the screw 143 in the left-hand end of the arm 141. If a single pawl 136 were employed in connection with a single cam 133 the spring 137 would act to rock the shaft 140 when the notch between the faces 134 and 135 is reached and this rocking of the shaft 140 would cause the set screw 142 to be moved downwardly so that the lever 141 would occupy its dotted line position shown at 144 in Fig. 5. Consequently the latch 84 would be moved downwardly so as to release it from the fixed pawl 86 which is secured to a plate 145 mounted on the meter housing by means of the cap screws 146, 146 shown in Fig. 4. To a downward extension 147 from the plate 145 is secured a guide bracket 148 as shown in Fig. 5, and when the pawl 86 is depressed against the action of the spring 85 as viewed in Fig. 5, the link 83 will be released and its right-hand end will slide along the guide 148 while its left-hand end will be moved by the connections shown in Fig. 1. That is to say, when the meter operates the cam 133 to a position where the spring 137 can act to trip the latch mechanism shown in Fig. 5 the spring 80 shown in Fig. 1 will close the valve 79 and automatically discontinue the flow of the liquid.

By shifting the position of the shaft 117 toward the right as viewed in Fig. 4, the gear 119 may be brought into mesh with the gear 109 and held in this position by the lever 122 resting in the slot 125. The gears 119 and 109 are of such ratio that when the gear 116 is rotated the rotation imparted to the gear 115 will be at a lower speed and therefore a larger number of gallons will flow through the meter before the cam 133 shown in Figs. 4 and 10 will be rotated to a position where the cam faces 134 and 135 will permit the pawl 136 to move toward the shaft 139 and permit the spring 137 to rock the shaft 140 and trip the latch mechanism shown in Figs. 1 and 5 and automatically cut off the flow of the liquid to the delivery nozzle.

In a similar manner when the gear 118 is brought into mesh with the gear 108 and the lever 122 placed in the slot 126, the gear 130 will be rotated at a still lower rate of speed and consequently a still greater number of gallons of liquid must flow through the meter before the rock shaft 140 will be operated by the cam 133 to effect tripping of the latch mechanism shown in Figs. 1 and 5 and the consequent stopping of flow of liquid through the delivery nozzle. It will thus be seen that by means of various ratios of gearing the automatic stopping of the flow may be predetermined so that at thirty, fifty, and fifty-five gallons, for instance, according to whether the lever 122 is in the slot 124, the slot 125, or the slot 126, the apparatus may be started and when the predetermined quantity is delivered the flow will be automatically stopped. Therefore when a container holding thirty gallons, for instance, is to be filled the flow may be started into the filling opening with the assurance that the mechanism will automatically cut off the flow when the thirty gallons has been delivered. Likewise if the container is of fifty gallon capacity, delivery may be started with the assurance that the flow will be cut off when fifty gallons has been delivered. In the same manner a fifty-five gallon container may be filled. The apparatus may be constructed by means of the proper gear ratios to fill barrels or other containers having varying capacities with the assurance that when the lever 122 is set in a certain notch indicating the capacity of the barrel or container, the flow will be automatically cut off as soon as the predetermined quantity has been delivered. In order to fill barrels or other containers of larger capacity than that permitted by the use of one gear 130 and one cam 133, I have provided an additional gear 149 with a drum 150 thereon and a cam 151 connected thereto. That is to say, the gear 149, the drum 150 and cam 151 constitute a unit similar to that composed of the gear 130, the drum 131 and cam 133. These two units are both loosely mounted on the shaft 139. Fig. 9 is a side elevation of the unit comprising the gear 149, drum 150 and cam 151, this view being taken on the line 9—9 of Fig. 4 looking in the direction of the arrows. The cam 151 is provided with a radial face 152 and an inclined face 153 which are respectively similar to the cam faces 134 and 135 of the cam 133 shown in Fig. 10; Fig. 10, however, is a view looking in the opposite direction.

Mounted on the frame arm 138 is a pawl 154 in position to wipe on the peripheral face of the cam 151. The pawl 154 is similar to the pawl 136 and both of these pawls are mounted on the frame arm 138 by means of the set screws 155 and 156 fitting in slots of the pawls 136 and 154 as shown in Fig. 4. The rear view of the frame arm 138 with the pawls 154 and 136 mounted thereon is shown in Fig. 13.

At the left-hand side of the cam 133 is mounted a mutilated gear 157. As shown in Fig. 4, the mutilated gear has a recess 158 in a disc 159 and on the disc 160 of less diameter are two gear teeth 161 opposite the recess 158. Fig. 10, which is a sectional elevation on the line 10—10 of Fig. 4 looking in the direction of the arrows, shows the larger disc 159 and the smaller disc 160. The gear teeth 161 are on the smaller disc 160 and the recess 158 is immediately back of the gear teeth 161 and between the same but on the disc 159.

Mounted on a counter-shaft 162 as shown in Fig. 4 is a gear 163 having four teeth on the right-hand portion in position to mesh with the recess 158 and the gear teeth 161. The gear 163 has eight teeth on the left-hand portion in position to mesh with the gear 149. A similar set of two gear teeth 161' in the disc 160 with the recess 158' between the same on the disc 159 is arranged diametrically opposite the gear 163 as shown in Fig. 10. Therefore each time the cam 133 makes half a rotation, the gear 163 will be given a quarter rotation. When the cam 133 makes a complete rotation, the gear 163 will be given a half rotation. Since the gear 163 is mounted loosely on the shaft 162, no rotation will be imparted to the latter when the cam 133 rotates. It should also be understood that two of the four teeth at the right-hand portion of the gear 163 ride along the peripheral cylindrical surface of the disc 159 and thus lock the gear 163 against rotation, except when the recesses 158, 158' and gear teeth 161, 161' are reached. Only then can the gear 163 be rotated a quarter rotation each time.

The left-hand portion of the gear 163 has eight teeth which mesh with twenty teeth on the gear 149. Each time the cam 133 is given a complete rotation, the gear 149 is stepped around four teeth or one-fifth of a complete rotation. Therefore the cam 133 must rotate five times to transmit through the gear 163 one complete rotation to the gear 149 and the drum 150 and cam 151 connected thereto.

Initially the pawl 136 will rest in a slot between the cam faces 134 and 135 with the pawl 136 above the cam face 134. Likewise initially the pawl 154 will rest in the recess between the cam faces 152 and 153. The initial position of the cam 151 is shown in dotted lines at 152' and 153' in Fig. 9 with the pawl 154 above the radial cam face. The initial positions of the cams 133 and 151 are indicated by zero marks 164 and 165 on the faces of the drums 131 and 150 and these zero marks may be seen through windows 166 and 167 as shown in Fig. 3.

Irrespective of the position of the lever 122 in one of the slots 124, 125 and 126 since the hub 123 is loose on the shaft 117, the knob 121 may be given an anti-clockwise rotation as viewed from the right-hand portion of Figs. 3, and 4. This will enable rotation to be imparted to the drums 131 and 150 notwithstanding the fact that the worm gearing 92, 98 is locked against rotation. Anti-clockwise movement of the knob 121 will give a clockwise movement to the gear 107. As viewed in Fig. 12, this would be an anti-clockwise movement of the gear 107 and therefore the ball clutch mechanism would be released to permit free rotation of the gear 107. Since the gear 107 is mounted loosely on the shaft 105, no rotation is imparted to any of the gears 108, 109, 110 and 115. The rotation of the gear 116 by turning the knob 121 in an anti-clockwise direction will not cause the gear 107 to interfere with the rotation of the gear 115 when one of the gears 118, 119 or 120 is in mesh with one of the gears 108, 109 or 110. Therefore if a thirty gallon container is to be filled, the lever 122 may be placed in the notch 124 to bring into mesh the gears 120 and 110. Now upon rotation of the knob 121 in an anti-clockwise direction the gear 115 will be rotated in a clockwise direction, and likewise the drums 131 and 150, and this operation is continued until the zero marks 164 and 165 show at the windows illustrated in Fig. 3. At this time the pawls 136 and 154 will rest in the recesses of the cams 133 and 151 above the radial faces thereof. The spring 137 is now holding the lever 141 of Fig. 5 in its dotted line position shown at 144. The operator may lift the extension nozzle 62 by means of the lever 66 and lower it into the filling opening of the barrel or container. Then upon operating the lever 73 to open the valve 79 the flow from the supply pipe 14 through the meter to the container will immediately begin. The starting of the operation of the meter shown in Fig. 2 rotates the shaft 50 and consequently operates the worm gearing 92, 93 shown in Fig. 7. As above explained the meter is so constructed and arranged as to cause the worm 92 to rotate in a clockwise direction as viewed in Fig. 4 and impart a clockwise movement to the worm gear 93 as viewed in Fig. 7. This in turn will impart a clockwise movement to the gear 104. The clutch shown in Fig. 12 then positively drives the gear 107 in a clockwise direction, as viewed from the right in Fig. 4. The gear 107 being in mesh with the gear 116 as shown in Fig. 4, will impart an anti-clockwise movement to the gear 120. The train of gearing 110, 115, 128 and 130 then imparts a clockwise rotation to the gear 130, the drum 131 and the cam 133. It will thus be seen that when the operator by means of the lever 73 opens the valve 79 to start the flow through the meter, the cam 133 will immediately begin to rotate in a clockwise direction as viewed from the right-hand end of Fig. 4. The cam face 135 being on the upper side of the pawl 136 will immediately force the latter backwardly and so also the frame arm 138 against the action of the spring 137. This will rock the shaft 140 shown in Fig. 5 to lift the latch arm 141 to its full line position. Consequently when the nozzle valve 79 is open the link 83 is thrust backwardly toward the meter until the spring 85 snaps the latch 84 back of the fixed pawl 86 as shown in Fig. 5 without interference from the set screw 142 of the tripping device.

It should be noted that the two diametrically disposed double-toothed mutilated gears on the cam 133 are so arranged that one of them will be adjacent the cam face 135 and the other in mesh with the right-hand portion of the gear 163. Furthermore, at this time the pawl 154 is above the cam face 152 of the cam 151. Immediately upon starting the meter which effects clockwise rotation of the cam 133 as viewed from the right-hand end of Fig. 4, movement will be imparted to the cam 151 through the gear 163 and therefore both of the cam faces 135 and 153 will engage their respective pawls 136 and 154 to force back the frame arm 138. Furthermore, while the recess in the cam 133 will move opposite the pawl 136 upon making a complete rotation, the arm 138 will be held in its rearward position by the pawl 154 engaging the circular face of the cam 151. As soon as the cam 151 makes a complete rotation the pawl 154 will be ready to drop into the recess in the cam 151 above the radial face 152, but at this time the pawl 136 is riding on the circular face of the cam 133 and not until the cam 133 makes another half rotation are both of the recesses in the cams 133 and 151 opposite the pawls 136 and 154. When this occurs the zero marks on the drums 131 and 150 are visible through the windows as shown in Fig. 3.

From the foregoing it will be seen that immediately upon the starting of the rotation of the gear 130 the gear 149 will be rotated two teeth or one-tenth of a rotation and both of the cam faces 135 and 153 will be moved below the pawls 136 and 154 so that the arm 138 will be thrust back to hold the tripping mechanism shown in Fig. 5 in inoperative position. On every half rotation of the cam 133 the gear 149 will be stepped around two teeth or one-tenth of a rotation. Upon each complete rotation of the cam 133 the gear 149 will be stepped around one-fifth of a rotation.

Upon the completion of five rotations of the cam 133 both of the cams 133 and 151 will be back in their initial positions. Both of the pawls 136 and 154 will then snap into the recesses above the radial faces 134 and 152. The spring 137 therefore then rocks the shaft 140 to move the tripping device to its dotted line position. The set screw 142 forces the latch 84 downwardly and releases it from the pawl 86. Therefore the spring 80 shown in Fig. 1 acts to close the valve 79 automatically and pull the link 83 toward the left so that the latch 84 will be below the pawl 86.

If the operator desires to control the dispensing of a less quantity of liquid than the quantity predetermined by the apparatus above described, he may start the flow by operating the lever 73 and effect discontinuance of the flow at any time by pressing the push-button 168 shown in Fig. 5. This will cause the release of the latch 84 from the pawl 86 and permit the spring 80 of Fig. 1 to close the valve 79. He may then operate the knob 121 of Fig. 4 to restore the drums 131 and 150 to their zero positions as indicated by the zero marks 164 and 165 in Fig. 3. Suitable designations may be placed on the drum 131 to indicate small quantities of liquid dispensed by means of the push-button operation. Designations may be placed on the drum 150 to indicate certain portions of the entire quantity predetermined by the lever 122 in the notch 124. For instance, if the drum 131 rotates five times in the dispensing of thirty gallons, it will rotate once for the dispensing of three gallons and the first third of the drum 131 may have designations of "pints" and "quarts". The second third and last portion may also be designated "gallons", "quarts" and "pints" up to three gallons. The drum 150 rotates only once for the dispensing of thirty gallons when the lever 122 is in the notch 124 and therefore the designations on the drum 150 may be for certain proportions of the thirty gallon quantity or this drum 150 may be provided with spaces and designations representing three gallons each. For this purpose the markings on the drums 131 and 150 may be tested by calibrations, particularly since the first stepping around of the drum 150 of one-tenth of a rotation does not represent the dispensing of three gallons, but it is only after the drum 131 has made a complete rotation and the drum 150 is stepped a second time one-tenth of a rotation that three gallons is dispensed. When the operation is taken into consideration, however, it can readily be seen that accurate designations may be placed on the drums 131 and 150 to indicate the dispensing of quantities by the push-button operation less than the total predetermined quantity. It is more advantageous, however, to have the markings on the drum 131 because it occurs in practice that the operator often wishes to permit the flow of one or more pints of liquid for sampling purposes, and when this is done the knob 121 may be operated as above described to re-set the drums 131 and 150 back to their zero positions.

The totalizer 169 is for the purpose of indicating and recording the total number of predetermined quantities of liquid dispensed. For instance, if the lever 122 is in the thirty gallon notch 124, and barrels or containers of thirty gallons each are filled automatically, the totalizer will indicate and record the number of barrels or containers that have been filled. Likewise if the lever 122 is in the fifty gallon notch and barrels or containers of fifty gallon capacity each are filled, the totalizer will indicate and record the number of such barrels or containers of fifty gallons each that have been filled. In the same manner when the lever 122 is in the fifty-five gallon notch 126, the totalizer will indicate and record the number of the containers which have been filled. In other words, the totalizer is not intended to indicate and record at all times the total number of gallons dispensed, but only the total number of units of predetermined quantities that have been filled. In other words, the totalizer indicates and records the number of packages or units that have been filled whether such packages or units have any one of a plurality of predetermined capacities each.

For this purpose the operating shaft 170 of the totalizer 169 passes loosely through the worm gear 98 and has secured to its right-hand end the gear 171 which is connected by a Geneva gear movement 172 to the cam 151. This Geneva gear movement comprises a gear similar to that designated 163 with the same number of teeth arranged in the same way. Both of the gear wheels 163 and 172 may be loose on the shaft 162. The disc 173 with the recess 174 therein and the disc 175 with the teeth 176 thereon are similar to the recess 158 and teeth 161 shown in Fig. 10. On the left-hand face of the cam 151 the recess 174 and the teeth 176 are arranged adjacent the cam recess having the faces 152 and 153. Therefore after the drum 150 has been given a half rotation or about when the container being filled is half full the Geneva gear movement 172 will step the gear 171 around two teeth. The digit wheel 177 is directly connected to the gear wheel 171. Therefore upon each complete rotation of the drum 150 the digit wheel 177 will be stepped forward to bring into view as shown in Fig. 3 the next numeral to indicate one additional package or container filled. The usual Geneva gear movements are placed at 178 between the digit wheels 179, 180 and 181 so as to operate them successively to indicate a total of 99,999 packages or containers filled.

As shown in Figs. 3 and 6, the removable cover 54 may be provided with an elongated opening for receiving a glass panel 182 back of which may be secured a label plate 183 with space for directions and advertising while at the same time having suitable openings for the reading of the package totalizer and for the reading of the designations on the drums 131 and 150. It is particularly important that the openings 166 and 167 shall be provided for observation of the zero marks 164 and 165 on the drums 130 and 150 so that the operator may be assured that before beginning the filling of the container the apparatus is set in initial position.

In order to lubricate the worm gearing 92, 98 a wick 184 saturated with oil may be mounted in the cover 54 as shown in Figs. 2 and 4, such wick being attached to the knob 185 so as to be removable therewith.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In dispensing mechanism, the combination with a meter, of means for predetermining the quantity of liquid to be delivered as a unit, and stopping the flow upon delivery of such quantity, and mechanism operated by said meter for indicating the quantity as a number of units delivered.

2. In dispensing apparatus, the combination with a meter, of mechanism operated by said meter for automatically stopping the flow when a predetermined quantity of liquid has been delivered as a unit, and means operated by said stopping mechanism for automatically indicating the number of units delivered.

3. In dispensing apparatus, the combination with a meter, of mechanism operated thereby for stopping the flow when a predetermined quantity of liquid has passed through the meter as a delivery unit, and means operated by the meter through said stopping mechanism to indicate the number of units delivered.

4. In dispensing apparatus, the combination with a meter, of adjustable mechanism operable by said meter for effecting the automatic delivery as a unit of any one of a plurality of predetermined quantities of liquid, and means for registering the number of units delivered.

5. In a barreling unit, the combination with a delivery nozzle of a self-closing valve therefor, a lever connected to said valve to open the same, automatic latch mechanism for holding said valve open, a meter, means operable by said meter for tripping said latch mechanism to effect the closing of said valve when a predetermined quantity of liquid has been delivered through said nozzle as a unit, mechanism for adjusting said means to be tripped when any one of a plurality of quantities has been delivered, and a totalizer for recording the number of units delivered.

6. In dispensing apparatus, the combination with a supply pipe, of a meter suspended therefrom and swiveled thereto to swing on the upright axis of said pipe, a delivery pipe carried by said meter, a vertical delivery nozzle, and means for controlling the flow through said nozzle.

7. In dispensing apparatus, the combination with a support, of a meter swiveled thereto to swing on an upright axis, a delivery pipe, a delivery nozzle, and means for controlling the flow through said nozzle.

8. In dispensing apparatus, the combination with a support, of a meter swiveled thereto, a delivery pipe, a delivery nozzle, an auxiliary extension nozzle, means for lifting and lowering said extension nozzle, and mechanism for controlling the flow through said nozzle.

9. In dispensing apparatus, the combination with means for automatically delivering a predetermined quantity of liquid to fill a container having a capacity corresponding to such predetermined quantity, of mechanism for controlling said delivering means, and a totalizer for recording the number of containers filled.

10. In dispensing apparatus, the combination with means for automatically delivering liquid to fill a container of predetermined capacity, of mechanism for adjusting said delivery means to deliver liquid to fill a container of different capacity, and apparatus for recording the number of containers filled whether of one capacity each or of another capacity each.

11. In dispensing apparatus, the combination with a meter, of means operated thereby for automatically filling containers of varying capacities, mechanism for adjusting said filling means in accordance with the capacity of the containers to be filled, and a totalizer for recording the number of containers filled whether of one capacity or another.

12. In dispensing apparatus, the combination with a meter, of means operated thereby for automatically dispensing a predetermined quantity of liquid, a totalizer operable by said dispensing means when a portion of said quantity has been delivered to record the total quantity as a unit, manually operated means for stopping such dispensing at any time, and a restoring connection to said dispensing means to permit small quantities of liquid to be dispensed without operation of said totalizer and to permit said dispensing means to be restored to initial position for the automatic delivery of a full predetermined quantity and the recording thereof as a unit of delivery on said totalizer.

13. In dispensing apparatus, the combination with means for predetermining any one of a plurality of units of liquid to be dispensed, of means for automatically discontinuing flow of liquid when the selected predetermined unit has been dispensed, means for controlling the starting of the delivery of the selected unit, and a totalizer for recording the number of the selected units dispensed.

14. In dispensing apparatus, the combination with dispensing apparatus, of means for automatically stopping the flow when a predetermined quantity has been dispensed, a plurality of ratio gearing for predetermining the quantity to be dispensed, and means for selecting the proper ratio gearing in advance to effect such stopping for the desired one of a plurality of predetermined quantities.

15. In dispensing apparatus, the combination with a supply pipe, of a meter connected thereto, a vertical delivery pipe connected to said meter, a delivery nozzle, mechanism for adjusting the elevation of said delivery nozzle relatively to said vertical delivery pipe, a self-closing valve at the lower end of said delivery pipe to control the flow to said nozzle, means for opening said valve, mechanism for holding the valve open, and means operated by the meter for tripping said holding mechanism and stopping the flow when a predetermined quantity has been dispensed.

16. In dispensing apparatus, the combination with a supply pipe, of a meter suspended therefrom, a delivery pipe carried by said meter, a delivery nozzle, means for elevating and lowering said delivery nozzle relatively to said delivery pipe, means for controlling the starting of the flow, and means operated by the meter for automatically stopping the flow after a predetermined quantity has passed through the meter.

17. In dispensing mechanism, the combination with a meter, of means for predetermining the quantity of liquid to be delivered as a unit and stopping the flow upon delivery of such quantity, mechanism operated by said meter for indicating the quantity of liquid flowing through the meter, and additional mechanism operated by said meter for indicating the number of units delivered.

18. In dispensing apparatus, the combination with a meter, of means for predetermining the quantity of liquid to be delivered as a unit and stopping the flow upon the delivery of such quantity, means operated by said meter for indicating the quantity delivered, and additional mechanism for indicating the number of units delivered.

19. In dispensing apparatus, the combination with a meter, of means for predetermining the quantity of liquid to be delivered as a unit and stopping the flow upon delivery of such quantity, a plurality of digit wheels associated with said predetermining means to indicate the quantity as it flows through the meter, and means comprising additional digit wheels for indicating the number of units delivered.

20. In dispensing apparatus, the combination with a meter, of means for automatically stopping the flow when a predetermined quantity of liquid has been delivered as a unit, means for indicating the quantity of flow through the meter, a totalizer for recording the number of units delivered, and mechanism for resetting to initial position said indicating means prior to the use of the apparatus to dispense a different predetermined quantity as a unit.

21. In dispensing apparatus, the combination with dispensing mechanism, of means for predetermining the quantity to be dispensed as a unit of delivery, mechanism for automatically stopping the flow when such predetermined quantity has been delivered, means for indicating the quantity as it is flowing, and a totalizer connected to said indicating means to record the number of the units of delivery dispensed.

22. In a device for dispensing fluid, the combination, of selector means for conditioning the apparatus to dispense any one of a number of predetermined quantities of fluid as a unit of delivery and a totalizer for recording the number of units of said quantity dispensed.

23. In a device for dispensing fluid, the combination of means for delivering a predetermined quantity of fluid as a unit of delivery and means for recording the number of such units delivered by the apparatus.

24. In a device for dispensing fluid, the combination with a meter, of a delivery nozzle through which to deliver fluid from the meter, a valve for controlling the flow of fluid through the nozzle, manually operable means to open the valve, holding means to retain the valve in open position, releasing means to actuate the holding means to permit the valve to close and means controlled by the flow of fluid through the meter for actuating said releasing means after a predetermined volume of fluid has been discharged and means for recording the total amount of fluid discharged in this manner.

25. In a device for dispensing fluid, the combination with a meter, of a delivery nozzle through which to deliver fluid from the meter, a valve for controlling the flow of fluid through the nozzle, manually operable means to open the valve, holding means to retain the valve in open position, releasing means to actuate the holding means to permit the valve to close, a control means operable in response to the passage of a predetermined quantity of fluid through said meter to actuate said releasing means, control means operable in response to the passage of a different predetermined quantity of fluid to actuate said releasing means and means to selectively condition either one of said control means for operation.

26. The combination with a meter, of means to automatically stop the flow of fluid being dispensed after a predetermined quantity has been dispensed, said means including control means operable in response to the passage of a predetermined quantity of fluid through said meter to actuate said flow stopping means, control means operable in response to the passage of a different predetermined quantity of fluid to actuate said flow stopping means, and means to selectively condition either one of said control means for operation.

27. In dispensing apparatus, the combination with dispensing mechanism for delivering automatically a predetermined quantity of liquid as a unit, of means for selectively conditioning the same to deliver units of a desired size, and means for recording the number of units delivered.

28. In dispensing apparatus, the combination with a meter, of dispensing mechanism, means for automatically controlling said dispensing mechanism to deliver a predetermined quantity of liquid, adjusting mechanism for setting said controlling means to deliver any one of a plurality of predetermined quantities, and a totalizer operable by said meter through said controlling means to record the quantity of fluid so dispensed.

HOSMER L. BLUM.